April 14, 1970 J. R. ALBURGER 3,506,827
METHOD OF MASKING FLUORESCENCE IN FLUORESCENT DYE
TRACER INSPECTION PROCESS MATERIALS
Filed Jan. 22, 1968

INVENTOR
James R. Alburger

# United States Patent Office 3,506,827
Patented Apr. 14, 1970

3,506,827
METHOD OF MASKING FLUORESCENCE IN FLUORESCENT DYE TRACER INSPECTION PROCESS MATERIALS
James R. Alburger, 5007 Hillard Ave.,
La Canada, Calif. 91011
Filed Jan. 22, 1968, Ser. No. 699,536
Int. Cl. G01n 21/16, 21/38
U.S. Cl. 250—71                 9 Claims

ABSTRACT OF THE DISCLOSURE

A method (and applicable compositions) of masking out undesired effects of background fluorescence in liquid inspection process materials, such as rinse liquids dilution-expansion developers, and the like. The method involves a determination of the dimensional threshold of fluorescence response in the liquid material to be treated, after which an ultraviolet absorber dye is dissolved in the liquid to a concentration just sufficient, and no more, to depress the unwanted fluorescence response, whereby there is substantially no interference by the absorber dye with desired fluorescent indications resulting in the inspection process.

---

This invention relates to a method of masking the background fluorescence which may be found in liquid materials used in fluorescent inspection processes. More particularly, the invention relates to a method and means of masking out the fluorescence of an inspection developer material in such a way that there is substantially no interference by the masking agent with fluorescent indications as they are developed.

In addition, the methods of the invention may be applied so as to mask out fluorescent effects in a wide variety of fluorescent tracer materials which may consist of fluorescent liquids, or of fluorescent substances dissolved in liquids or resinous materials. The method is useful in connection with a variety of process materials, such as rinse liquids, sealants, or coating compounds, which may be desired to exhibit a minimum amount of fluorescence response. Although the method of the invention may be applied to many kinds of fluorescent tracer dye solutions, this specification is directed, by way of example, to the treatment of liquid-film dilution-expansion developers such as many be used in inspection penetrant processes.

Fluorescent inspection penetrant processes utilize, in general, three essential process materials; (1) a fluorescent penetrant, (2) a remover, and (3) a developer. In some cases, as in water-washable inspection penetrants, an emulsifier is incorporated in the penetrant itself, or is used as a coupler to render the penetrant material removable by means of a water wash. In any event, the treatment of test parts in accordance with the various steps of the inspection penetrant process results, up to the point where a developer is applied, in test surfaces which are relatively clean, and where any surface cracks or other discontinuities contain entrapments of fluorescent penetrant material, either in the form of a deposit of fluorescent dye or as a dyed liquid.

When a developer is applied to the test surface, it acts to draw out the penetrant entrapments from any surface defects to produce more-or-less brightly fluorescent defect indications. For optimum results of see-ability of these fluorescent indications, it is important that there be a minimum amount of background fluorescence, such that the significant indications may stand out with good contrast against a nonfluorescent background. This is particularly true in cases where the defects being sought are relatively small, such that the fluorescent indications which pertain are relatively faint.

Certain of the conventional developer materials for penetrants are inherently nonfluorescent. Such developers include (1) the so-called dry developer, which is simply a dry powder such as talc or silica aerogel, (2) wet developers, which are water-suspended slurries of talc or similar pigments, and (3) nonaqueous developers, which are suspensions of talc or silica aerogel in a volatile inorganic solvent. In all of these developers, the essential developer component is an inorganic pigment, and such materials are normally nonfluorescent.

Certain high-sensitivity developers, notably those which utilize liquid ingredients as the essential developer components, may exhibit a greater or lesser degree of fluorescence, depending on the particular liquid material which is employed, or on the presence of small traces of fluorescent contaminants. An important class of developers which utilize a liquid component for development are the so-called liquid-film dilution-expansion developers which are described in my U.S. Patent No. 3,184,596, issued May 18, 1965. I have found that in many instances, where dilution-expansion developers are formulated using liquid ingredients such as ethoxylated alkylphenols, glycol ethers, or aromatic hydrocarbons, an undersirable degree of background fluorescence may be encountered.

The use of an ultraviolet absorber material dissolved in the dilution-expansion developer might be thought of as a means of eliminating any residual fluorescence. However, if an ultraviolet absorber material is added without due consideration for its ability to quench fluorescence, it will normally be found that the ultraviolet absorber will also act to quench or depress the fluorescence of defect indications to an objectionable degree. I have discovered that by employing a method of careful control with respect to the concentration of an ultraviolet absorber, relative to the degree of initial fluorescence of the developer composition, the background fluorescence can be cancelled out or masked in such a way that there is substantially no interference with the development of fluorescent defect indications.

The principal object of the invention, therefore, is to provide a method and means of masking the background fluorescence of liquid compositions.

Another object of the invention is to provide a method of balancing the masking effect of an ultraviolet absorber in a liquid-film inspection penetrant developer so as to counteract the initial fluorescence of the developer without interfering with the action of the developer with respect to development of fluorescent defect indications.

Still another object of the invention is to provide liquid materials which are useful in fluorescent inspection processes involving fluorescent dyed liquid tracers, which liquid materials are quenched or masked with respect to their fluorescence to an optimum degree.

Other and incidental objects of the invention will, in part, be obvious, and will, in part, become apparent by referring to the following description thereof when read in conjunction with the drawings, in which.

Figure 5:
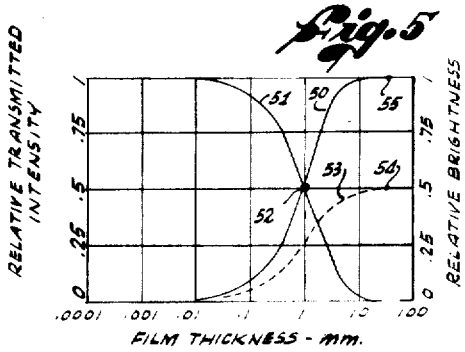
Figure 6:
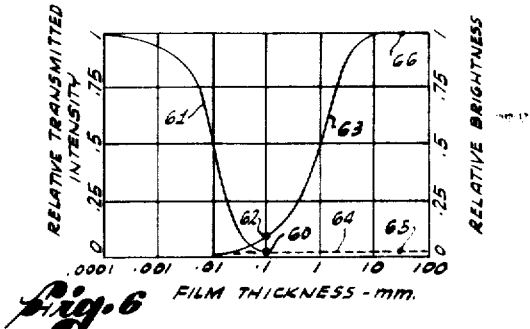
Figure 7:
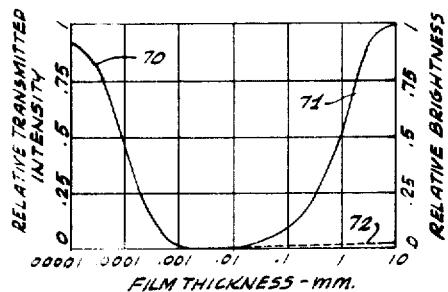
Figure 8:
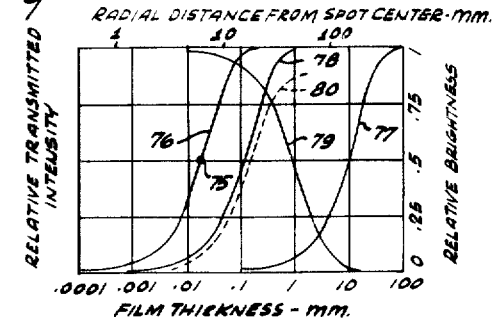

FIGS. 5, 6, and 7 are graphical illustrations of the fluorescence and absorption transition effects which may be obtained with mixtures of fluorescent and absorber dyes in the same solution, and FIG. 8 is a graphical illustration of fluorescence response and absorption characteristics in the various components of a fluorescent penetrant and liquid-film developer system employing the method of the invention.

Figure 1:
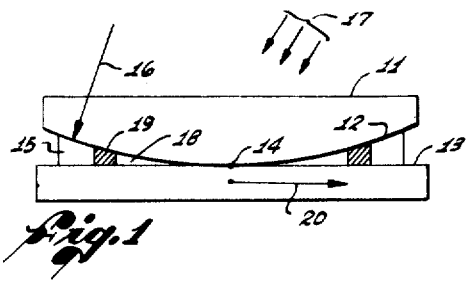
FIG. 1 is an illustration, in cross-section, of the Meniscus Method instrumentation, set up so as to measure the transition characteristic of a background fluorescence in a liquid material.

Referring now to the drawings in which the same reference numerals refer to the same elements, FIG. 1 illustrates in cross-section a so-called Meniscus Method instrument, which is described in detail in my U.S. Patent No. 3,107,298, issued Oct. 15, 1963. In this Meniscus Method apparatus, a clear glass lens 11 having at least one surface 12, which is convex in its curvature, is placed on an optically polished flat black glass platen 13 in such a way that the lens contacts the platen at point 14. A small quantity of fluorescent liquid 15 is introduced between the lens and platen, where it forms a meniscus-shaped layer in which the film thickness is substantially zero at point 14 and increases in accordance with the lens curvature as the radial distance 20 from point 14 is increased. The radius of curvature, indicated by arrow 16, of the surface 12 may be any arbitrarily selected value; however, a value of 106 cm. is the currently accepted value which is most useful in the measurement of fluorescence transition effects in inspection penetrant materials.

When a beam of ultraviolet radiation, indicated by arrows 17, is directed downward onto the above-described lens, platen and fluorescent liquid setup, a fluorescence response is generated in the liquid film 15. The fluorescence response, however, has a discontinuous characteristic, with respect to the film thickness of the liquid, so that in a circular region 18 surrounding the contact point 14, the fluorescent brightness is substantially zero, or at least close to zero.

At some critical film thickness represented by region 19, the fluorescence response undergoes a transition as the radial distance 20 from point 14 is increased, such that the fluorescent brightness rises rapidly to a maximum condition and thereafter levels off to a constant value. The radial distance 20 from point 14 at which this transition effect occurs may be accurately measured by means of a traveling microscope and a calibrated photocell with a pinhole reticle arranged so as to scan across the non-fluorescent spot in the Meniscus Method setup. The film thickness corresponding to a given radial distance 20 on the flat platen from point 14 may be determined from the relationship:

$$t = 472 \, r^2$$

where $t$ is the film thickness in millimicrons, and $r$ is the radial distance 20 in millimeters.

Figure 2:
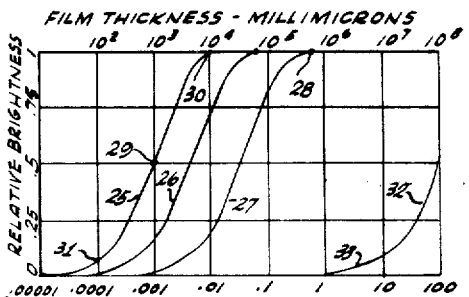
FIG. 2 is a graphical illustration of a family of fluorescence transition characteristic curves such as many be obtained with the setup of FIG. 1.

Referring now to FIG. 2, there is here illustrated a family of transition curves such as may be derived from measurements using the setup of FIG. 1. In this graphical presentation, the axis of abscissas, corresponding to film thickness values, is set forth on a logarithmic scale, while the axis of ordinates, corresponding to values of fluorescent brightness, is set forth on a linear scale in terms of absolute brightness in footlamberts or relative brightness from zero to unity, as may be desired.

In general, the transition curves 25, 26, and 27, and the other transition curves in the figures, follow the so-called Beer's law transition which is expressed by the relationship:

$$I = I_0 \times e^{-\alpha t}$$

where:

I = Intensity of transmitted radiation
$I_0$ = Incident intensity
$e$ = Base of natural logarithms
$\alpha$ = Absorption coefficient = $\lambda C$
$\lambda$ = Absorption coefficient per unit concentration
$C$ = Dye concentration
$t$ = Thickness of absorbing layer While certain deviations or "failures" in Beer's law have been noted, for the purpose of the present invention, and for the particular concentrations of ultraviolet absorber dyes which are used, the transition effects of fluorescence and absorption follow Beer's law with reasonable accuracy.

I have discovered a convenient way in which the Beer's law transition may be evaluated and the transition curve located. In accordance with my techniques, I may determine the maximum fluorescent brightness, for example, at a relatively large radial distance from the spot center (point 14 in FIG. 1). This measure provides a value (100% brightness) for the shoulder of the transition curve at point 28. If I now determine the film thickness, point 29, corresponding to exactly half the maximum brightness, then it turns out that the point of 99% brightness occurs at a point 30 at which the film thickness is almost exactly one decimal order of magnitude larger than the half-brightness film thickness. Also, if the fluorescent brightness is measured at a film thickness one decimal order of magnitude smaller than the half-brightness film thickness at point 31, it is found that the brightness at this point is about 6.65% of the maximum brightness.

If the fluorescence transition effect for a given dye is measured at various dye concentrations, it is found that a family of transition curves may be obtained similar to curves 25, 26, and 27. Where the liquid carrier has a degree of natural fluorescence, or where only small amounts of contaminant material are present in the liquid so as to cause some residual fluorescence, a transition curve 32 may be obtained which is positioned well to the right along the axis of abscissas on the chart. In any event, the natural fluorescence, or contaminant flourescence, as the case may be, will exhibit a Beer's law transition with respect to film thickness, such that a toe region 33 of the transition curve can be observed and measured as to its approximate dimensional magnitude by means of the Meniscus Method instrument.

Figure 3:
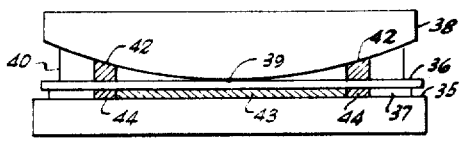
FIG. 3 is an illustration, in cross-section, of the Meniscus Method instrumentation, set up so as to measure the transition characteristic of a solution of an ultraviolet absorber dye.

Referring now to FIG. 3, there is here illustrated, in cross-section, an adaptation of the Meniscus Method instrument which permits measurement of the ultraviolet absorption characteristics of various absorber dyes. A black glass platen 35 is positioned horizontally, and a few drops of brightly fluorescent liquid are placed on its surface. A thin plate of clear glass 36 is placed over the puddle of fluorescent liquid in such a way that the fluorescent liquid forms a uniform layer 37 between the black glass platen 35 and the clear glass cover plate 36.

A convex glass lens 38 is positioned on the clear glass plate 36 so that it contacts the plate at point 39. A small quantity of a liquid solution of absorber dye is introduced between the lens 38 and the plate 36, such that it forms a meniscus-shaped film 40. When a beam of ultraviolet light, represented by arrows 41, is directed downward through the absorbing layer 40 onto the fluorescent layer 37, it is found that absorption of the ultraviolet radiation fails to occur in layer 40 in a circular region around point 39.

At some critical radial distance from point 39, a zone 42 is found, within which the ultraviolet absorption rises rapidly from less than 6.65% to greater than 99%. The result is that a brightly fluorescent spot 43 is seen, which is surrounded by a dark non-fluorescent area caused by the shadow of the absorption zone of the ultraviolet absorber dye. Also, there is seen a zone of brightness transition 44 corresponding to the shadow effect of the transition zone 42.

Figure 4:
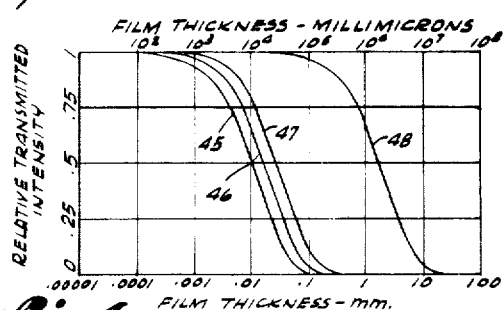
FIG. 4 is a graphical illustration of a family of ultraviolet absorption transition characteristic curves such as may be obtained with the setup of FIG. 3.

Referring now to FIG. 4, there is here illustrated a family of absorption transition curves for solutions of a given ultraviolet absorber dye at various concentrations. Here again, the axis of abscissas on the chart represents film thickness values set forth on a logarithmic scale. The axis of ordinates represents values of relative transmitted intensity set forth on a linear scale.

Curves 45, 46, and 47 illustrate the absorption transition characteristics of the dye 2,2'-dihydroxy-4,4'-dimethoxy-benzophenone at the concentrations 10, 5, and 2 grams per pint, espectively. When the concentration of the absorber dye is reduced to a value in the range of .03 gram per pint, the transition curve for the solution is moved well to the right of the chart, as shown by curve 48. It will be seen from FIG. 4 that the exact location of the curve of absorption transition, with respect to the axis of abscissas, may be controlled and adjusted merely by adjusting the concentration of the absorber dye.

Where it is desired to dissolve an ultraviolet absorber dye in a fluorescent liquid for purposes of masking out the fluorescence to an optimum degree, it is necessary to consider the relative effects of fluorescence transition and ultraviolet absorption in the liquid. In considering these combined effects, it will be realized that the ultraviolet absorber dye is dispersed in the same solution as is the fluorescent element, and the masking effect of the absorber dye is a progressive function of the depth to which the ultraviolet beam penetrates the liquid layer. In effect, the presence of an ultraviolet absorber dye in a solution of fluorescent material acts to reduce the efficiency of fluorescent response, thus depressing the brightness values of all points on the brightness response curve.

The effect of combined flunrecence and absorption may be better understood by referring now to FIG. 5, in which there are illustrated the various transitional effects which occur in a solution of an ultraviolet absorber in a fluorescent liquid. In this illustration, the effect of fluorescence transition is indicated by curve 50, and the effect of ultraviolet transmitted intensity is indicated by curve 51. The relative positions of these two curves along the axis of abscissas is adjusted by a procedure of adjusting relative dye concentrations so that the midpoint (or inflection point) of each curve is at about the same dimensional magnitude of film thickness, as shown by point 52.

When the two transition curves 50 and 51 are adjusted in the above-described manner, and when the corresponding dye concentrations are utilized in a combined solution of fluorescent material and ultraviolet absorber, then it is found that a resultant response transition curve is obtained similar to curve 53. In curve 53, the maximum value of fluorescent brightness is found on the shoulder of the curve at point 54, and this value is found to be about half the maximum brightness of the fluorescent component alone, as shown by point 55. It is seen, therefore, that the ultraviolet absorber dye, when used in a concentration as thus indicated, acts to depress the brightness of the fluorescent component in the liquid mixture by a factor of about 50%.

Referring now to FIG. 6, there is here illustrated a set of transition curves similar to those in FIG. 5, with the exception that the concentration of the ultraviolet absorber dye is increased so that the point of 99% absorption 60 on the absorption curve 61 is at about the same dimensional magnitude of film thickness as the point of 6.65% brightness 62 on the fluorescence transition curve 63. When the two transition curves 61 and 63 are adjusted in the above-described manner, and when the corresponding dye concentrations are utilized in a combined solution of fluorescent material and ultraviolet absorber, then it is found that a resultant response transition curve is obtained similar to curve 64. In curve 64, the maximum value of brightness, or the shoulder of the curve, at point 65 is found to be about 1% of the maximum brightness of the fluorescent component alone, as shown by point 66.

Referring now to FIG. 7, there is here illustrated a third set of transition curves similar to those shown in FIGS. 5 and 6, except that in this case the concentration of the absorber dye is increased to a point where its absorption transition characteristic 70 occurs well to the left on the axis of abscissas relative to the curve of fluorescence transition 71. Curve 72 indicates the effect of fluorescence transition which occurs in a thus-described mixture of fluorescent material and absorber dye. It will be seen, however, that the transition curve of ultraviolet absorption 70 is located at a range of dimensional magnitudes such that it would interfere with a fluorescence response curve of a typical fluorescent inspection penetrant.

From an examination of FIGS. 5, 6, and 7, it will be understood that there is an optimum concentration of ultraviolet absorber dye with respect to its effect of masking out residual fluorescence in a liquid material, this concentration being that corresponding approximately to that employed in the examples of FIGS. 5 and 6. It will be understood that an increase in concentration of the absorber dye beyond the point where its absorption shoulder, represented by point 60 in FIG. 6, has a dimensional magnitude smaller than that of the toe of the fluorescence transition curve (point 62) results in relatively little additional quenching or masking of fluorescence response.

More important, and inasmuch as it is an object of this invention to provide a method of masking background fluorescence to an optimum degree, where slight changes in the fluorescence transition characteristic due to the introduction of small amounts of fluorescent tracer into the liquid film, may be readily detected by an increase in fluorescent brightness, it is desirable that an excessive concentration of ultraviolet absorber dye in the fluorescent liquid be avoided.

Fluorescent inspection penetrants and fluorescent tracers such as leak tracers, tracers in insecticide sprays, and similar materials, usually exhibit fluorescence transition characteristics such that the inflection point of transition has a dimensional magnitude smaller than 20,000 millimicrons, corresponding to point 75 on curve 76 in FIG. 8. If, for example, a liquid film developer is to be used with a tracer having a transition characteristic similar to curve 76, or any curve to the left of this curve, and if, for example, the natural fluorescence of the developer liquid exhibits a transition effect as shown by curve 77, then when small quantities of the fluorescent tracer diffuse into the developer liquid, the effective concentration of fluorescent component in the developer liquid is increased so that a resultant transition curve 78 is obtained. Another way to view the developer action is to recognize that the concentration of dye in the fluorescent tracer (a penetrant for example) is diluted by a process of simultaneous dilution and expansion in accordance with the method of my above-mentioned U.S. Patent No. 3,184,596. The diluted tracer-developer mixture may have a transition characteristic at a location corresponding to curve 78, and the exact location of the operating point of fluorescent brightness for a given developed indication would be somewhere on curve 78, depending on the effective film thickness of the fluorescent tracer prior to development.

In any event, the transition curves for the pure fluorescent tracer and the developed fluorescent tracer are normally well to the left on the chart of FIG. 8, with respect to the curve of fluorescence transition for the developer liquid alone, as indicated by curve 77. Accordingly, it is possible to introduce an ultraviolet absorber dye into the developer liquid in such a way that its absorption characteristic corresponds to curve 79. When this is done with care, so that the background fluorescence is absorbed to an optimum degree, and no more, and the degree of brightness suppression in the developed indication is no more than a few percent, as indicated by curve 80, then an optimum condition of absorber dye concentration is obtained.

It will be understood that under circumstances where the natural fluorescence of the developer liquid is relatively great, curve 77 may be shifted to the left so that it is not far from curve 78, with the result that the selection of the optimum concentration for the absorber dye may become quite critical. In such cases, it becomes almost mandatory that the method of this invention be utilized to determine the optimum concentration of an absorber or masking dye. Otherwise, the effectiveness of the ultraviolet absorber will either be inadequate or excessive to the point where desired fluorescent indications will be quenched.

There are several modifications possible in the method of this invention for selecting an optimum concentration of absorber dye. Firstly, the procedure which yields a maximum degree of precision in determining the optimum concentration of absorber dye involves the above-mentioned use of a photocell readout device and a traveling microscope or a microscope with a micrometer stage which permits scanning across the Meniscus Method setup to determine the effects of absorption and fluorescence transition. For example, a microscope having a 10× objective and a 10× Huygens eyepiece with a 1 mm. diameter pinhole in its reticle plane will, when properly focused on the liquid film in the Meniscus Method setup, see a spot which is only .1 mm. in diameter. FIG. 8 has, at the top of the graph, a scale of abscissa values in terms of radial distance for spot center in the Meniscus Method. It will be seen that a viewing aperture of .1 mm. on the fluorescent field yields good accuracy in measuring many of the useful curves of transition for fluorescence and absorption. A properly calibrated photocell placed behind the pinhole aperture of the Huygens eyepiece will permit accurate measurements of fluorescent brightness of the .1 mm. diameter areas in the Meniscus Method field.

Another adaptation of the method of the invention is to make side-by-side visual comparisons of apparent spot diameter in accordance with the setups which are illustrated in FIGS. 1 and 3. For example, the fluorescent liquid which is to be treated with an ultraviolet absorber is set up for test under black light in accordance with the setup of FIG. 1. Then a suitable solvent liquid is selected and various concentrations of absorber dye are tried and tested in the setup of FIG. 3 until the spot diameter for the absorber dye solution is seen by a side-by-side comparison to be about the same or slightly smaller than that for the fluorescent liquid. The thus-determined absorber dye concentration, or a slightly greater concentration, is then used in preparing an absorber dye additive for the fluorescent liquid.

A third method of selecting an optimum concentration of ultraviolet absorber dye involves the use of two setups similar to that of FIG 1. The fluorescent liquid which is to be quenched or masked is placed in one setup, and the other setup is used to test various samples of the fluorescent liquid having different added concentrations of absorber dye. When the two Meniscus Method setups are examined visually side-by-side, under black light, it is possible to select a condition of absorber dye concentration at which the effective brightness of the mixture is reduced to about 1% to 50% of the initial brightness.

Still another modification of the method, which is equivalent to the above, avoids the use of a Meniscus Method setup, or permits a selection of absorber dye concentration in the event that a Meniscus Method instrument is not available. In accordance with this technique, a pair of flat glass plates is utilized. The fluorescent liquid to be quenched or masked is placed on one glass plate at the rate of about one drop per square inch, thereby providing a liquid layer about .001 inch thick when a second glass plate is placed over the liquid. The above-described sandwich arrangement is placed on a black surface such as a carbon tissue and is viewed under black light. If the fluorescent brightness is too low to be readily perceived, the amount of liquid in the assembly may be increased.

A second sandwich setup of glass plates and test liquid is prepared and is viewed side-by-side with the first setup. In this second setup, various concentrations of ultraviolet absorber dye are added to the fluorescent liquid, and a concentration is selected which is just sufficient to reduce the fluorescent brightness of the test liquid to about 1% to 50% of its initial brightness. This can be done with a reasonably satisfactory degree of accuracy. In cases where the natural fluorescence of the test liquid is quite faint, thick layers of liquid may be employed, as, for example, by utilizing a volume of liquid in a glass jar. A like volume of liquid containing a measured amount of absorber dye is compared visually under black light with the jar of untreated liquid, and a concentration of absorber dye is selected (and utilized) which suppresses the fluorescence response to a desired degree and no more.

It will be apparent to those skilled in the art that various other techniques or combinations of procedures may be employed to arrive at a value for the concentration of absorber dye which is optimum with respect to the quenching or masking of background fluorescence. In all cases, the method depends on the careful selection of concentration of an ultraviolet absorber dye so as to just cancel out the background fluorescence of the test liquid, and no more.

A wide variety of ultraviolet absorber dyes may be employed for the purpose of the invention, the selection of the dye which is employed being dependent on the solvency features of the liquid material which is to be quenched or masked. Many ultraviolet absorber dyes which are soluble in mineral solvents, alcohols or other solvent liquids are derivatives of benzophenone, a few examples being:

4,4'-bis-(dimethylamino)-benzophenone (Michler's ketone)
4,4'-bis-(diethylamino)-benzophenone
2,4-dihydroxy-benzophenone
2-hydroxy-4-methoxy-benzophenone
2,2'-dihydroxy-4,4'-dimethoxy-benzophenone
2,2'-tetrahydroxy-benzophenone
2-hydroxy-4-methoxy-benzophenone-5-sulfonic acid
sodium - 2,2' - dihydroxy - 4,4' - dimethoxy - 5 - sulfobenzophenone
2,2'-dihydroxy-4-methoxy-benzophenone
2,2'-dihydroxy-4-n-octoxy benzophenone
2-hydroxy-4-methoxy-2'-carboxy benzophenone Other dyes and dye-type materials may also be utilized, such as any one of the group of ultraviolet absorbing agents disclosed in U.S. Patent No. 2,653,109, or any one of the group of triazine derivitives disclosed in U.S. Patent No. 2,171,427. Some typical examples of such materials are:

sodium-bis-(2-hydroxy-4-phenylamino-1,3,5-triazyl-(6))-benzidine-disulfonic acid
sodium-1,4-bis-(2-hydroxy-4-phenylamino-1,3,5-triazyl-(6))-amino benzene-disulfonic acid
2,3-diphenyl-quinoxaline
2,3-diphenyl-6-methyl-quinoxaline
5,6-dibromo-8-hydroxyquinoline For the purpose of illustrating the method of the invention, the preparation of a dilution-expansion developer containing an ultraviolet-absorbing masking ingredient is described in the following example:

EXAMPLE NO. I

A dilution-expansion developer for use in the development method of my U.S. Patent No. 3,184,596 was prepared as follows:

Fluorocarbon liquid (Fluorolube S–30, Hooker Chemical Co.)—80 ml.
Silica aerogel—80 gm.
Methylene chloride to make 1 gallon The thus-prepared developer composition was examined under black light in a test setup similar to that of FIG. 1, and it was noted that there was a substantial amount of background fluorescence response, arising either from natural fluorescence or from the presence of a fluorescent contaminant.

A sample of the developer composition was filtered to remove the silica aerogel, and evapoarted to remove the methylene chloride. The remaining liquid was tested in the Meniscus Method setup, and it was found that a fluorescent brightness of about 3 footlamberts was obtained at a film thickness of about 180,000 millimicrons. It was noted that typical fluorescent dyes yield maximum brightness values in the range of 50 footlamberts under standard conditions of black light irradiation, so it was assumed that the thus-measured point of 3 footlamberts brightness represented the toe dimension of transition for the contaminated Fluorolube liquid.

A series of transition curves were measured for various concentrations of the dye 2,4-dihydroxy-benzophenone dissolved in methyl isobutyl ketone, which was arbitrarily selected as being a suitable nonfluorescent liquid and a good solvent for the ultraviolet absorber dye. It was found that a concentration of about .004 grams per 80 ml. of the methyl isobutyl ketone liquid was sufficient to provide an ultraviolet absorption of about 99% at a film thickness of 18,000,000 millimicrons. Also, it was found that a concentration of about .85 gram per 80 ml. was sufficient to provide a 99% absorption at a film thickness of 180,000 millimicrons.

Using the thus-determined range of absorber dye concentrations with respect to the fluorocarbon ingredient, about .005 gram of the 2,4-dihydroxy-benzophenone dye was dissolved in the developer formulation of this example. The result was that the background fluorescence of the developer was effectively reduced by more than 50%. The developer was sprayed onto test parts which had been treated with a high sensitivity fluorescent inspection penetrant which was formulated using a fluorocarbon vehicle liquid. Submicroscopic entrapments of penetrant in surface discontinuities were developed to form brightly fluorescent indications which showed with excellent contrast against a nonfluorescent background.

EXAMPLE NO. II

A fluorescent leak tester liquid was prepared consisting of a mixture of fluorescent dyes dissolved in diethylene glycol and a volatile extender consisting of methylene chloride. The resulting low viscosity tracer liquid was allowed to seep through submicroscopic crack defects in a welded seam of a tank. The tank was pressurized to accelerate any leakage, and after a suitable dwell time to permit leakage to occur, a film of mineral thinner (kerosene) was sprayed on the outside surface of the tank, where the kerosene acted to freeze small exudations of glycol to prevent them from spreading and diffusing.

In the above leakage test, it was observed that the small amount of natural fluorescence in the kerosene served to interfere with a clear visual discernment of extremely minute leak indications. Accordingly, a pint jar of kerosene was examined under black light to determine the approximate degree of natural fluorescence. A small amount of a tetra-substituted benzophenone dye was added to the pint volume of kerosene, just sufficient to quench the natural fluorescence. Use of this masked and quenched kerosene in the above-described leakage test showed a distinct improvement in the clairty and contrast of the leakage indications.

As pointed out above, the method of this invention may be applied to many kinds of liquid materials. The utility of the method and the resultant quenched or masked liquid materials is found mainly in connection with inspection processes where an excessive amount of background fluorescence can seriously interfere with the effectiveness and sensitivity of the inspection process. Accordingly, I do not limit my method, or the liquid materials which are properly masked with respect to background fluorescence in accordance with my method, to those techniques or solvent materials which are described by way of example in this specification.

There are numerous inspection applications involving the detection of traces of fluorescence, in which solvent liquids are employed such as mineral oils, aromatic hydrocarbons, aliphatic hydrocarbons, ketones, alcohols, glycols, glycol ethers, esters, plasticizers, detergent liquids, fluorocarbons, halocarbons, water, and other unclassified liquids. In all cases where a natural fluorescence of the liquid, or the presence of a fluorescent contaminant, acts to interfere with the visual detection of fluorescent indications, and where in addition, the use of an ultraviolet absorber in an excessive concentration might adversely affect the fluorescence response of traces of fluorescent dye solutions, it is important that the concentration of the absorber dye be adjusted accurately to an optimum condition. The method of this invention provides a means to this end.

In cases where a liquid having some natural fluorescence is used as a carrier for particulate fluorescent indicators, the method of this invention does not apply. For example, in the fluorescent magnetic particle method of inspection for crack defects in ferromagnetic test parts, finely dispersed particles of magnetic iron oxide coated with a fluorescent substance are suspended in a liquid carrier which often exhibits a substantial amount of background fluorescence. This background fluorescence may be quenched by dissolving an absorber dye in the liquid to a relatively high concentration with little or no effect on the fluorescent brightness of the coated magnetic particles. Thus, there is no need here for employing an accurately adjusted concentration of ultraviolet absorber dye.

While I have described in some detail several embodiments of my invention, it will be readily apparent that many changes and modifications may be made that lie within the scope of the invention. Therefore, I do not intend to be limited by the specific embodiments shown, but only by the appended claims.

What is claimed is:

1. In a fluorescent tracer insection system, a method of quenching residual fluorescence in a liquid component of said system comprising the steps of, (a) measuring the fluorescence transition characteristic of said liquid component to determine the dimensional magnitudes of film thicknesses corresponding to the toe region and shoulder region of fluorescence transition, (b) measuring the ultraviolet absorption transition characteristic of a solution of an ultraviolet absorber dye at various concentrations, (c) selecting a concentration for said ultraviolet absorber dye such that its point of maximum absorption, corresponding to about 99% absorption, occurs at a dimensional magnitude of film thickness which lies within the range from a value about equal to the film thickness at the toe region to a value about equal to the film thickness at the shoulder region of said fluorescence transition, and (d) dissolving the said ultraviolet absorber dye in said liquid component to a concentration about equal to the said selected concentration.

2. A liquid component of a fluorescent dye tracer inspection system in which a residual fluorescence response of said liquid component is quenched by the addition of an ultraviolet absorber dye, said ultraviolet absorber dye being present in a concentration sufficient to reduce the brightness of said residual fluorescence to about 1% to 50% of its initial value.

3. A method in accordance with claim 1 in which said liquid component is at least one member selected from the group consisting of liquid film dilution-expansion developers, rinse liquids mineral, oils, aromatic hydrocarbons, aliphatic hydrocarbons, glycols, ketones, alcohols, glycol ethers, esters, plasticizers, detergent liquids, fluorocarbons, halocarbons, and water.

4. A method in accordance with claim 1 in which said ultraviolet absorber dye is at least one member selected from the group consisting of:
 4,4'-bis-(dimethylamino)-benzophenone (Michler's ketone)
 4,4'-bis-(diethylamino)-benzophenone
 2,4-dihydroxy-benzophenone
 2-hydroxy-4-methoxy-benzophenone
 2,2'-dihydroxy-4,4'-dimethoxy-benzophenone
 2,2'-tetrahydroxy-benzophenone
 2-hydroxy-4-methoxy-benzophenone-5-sulfonic acid
 sodium-2,2'-dihydroxy-4,4'-dimethoxy-5-sulfobenzophenone
 2,2'-dihydroxy-4-methoxy-benzophenone
 2,2'-dihydroxy-4-n-octoxy benzophenone
 2-hydroxy-4-methoxy-2'-carboxy benzophenone
 sodium-bis-(2-hydroxy-4-phenylamino-1,3,5-triazyl-(6))-benzidine-disulfonic acid
 sodium-1,4-bis-(2-hydroxy-4-phenylamino-1,3,5-triazyl-(6))-amino benzene-disulfonic acid
 2,3-diphenyl-quinoxaline
 2,3-diphenyl-6-methyl-quinoxaline
 5,7-dibromo-8-hydroxyquinoline 5. A liquid component in accordance with claim 2 in which said component is at least one member selected from the group consisting of liquid film dilution-expansion developers, rinse liquids, ketones, alcohols, glycols, glycol ethers, esters, plasticizers, detergent liquids, fluorocarbons, halocarbons, and water.

6. A liquid component in accordance with claim 2 in which said ultraviolet absorber dye is at least one member selected from the group consisting of:
 4,4'-bis-(dimethylamino)-benzophenone (Michler's ketone)
 4,4'-bis-(diethylamino)-benzophenone
 2,4-dihydroxy-benzophenone
 2-hydroxy-4-methoxy-benzophenone
 2,2'-dihydroxy-4,4'-dimethoxy-benzophenone
 2,4'-tetrahydroxy-benzophenone
 2-hydroxy-4-methoxy-benzophenone-5-sulfonic acid
 sodium-2,2'-dihydroxy-4,4'-dimethoxy-5-sulfobenzophenone
 2,2'-dihydroxy-4-methoxy-benzophenone
 2,2'-dihydroxy-4-n-octoxy benzophenone
 2-hydroxy-4-methoxy-2'-carboxy benzophenone
 sodium-bis-(2-hydroxy-4-phenylamino-1,3,5-triazyl-(6))-benzidine-disulfonic acid
 sodium-1,4-bis-(2-hydroxy-4-phenylamino-1,3,5-triazyl(6))-amino benzene-disulfonic acid
 2,3-diphenyl-quinoxaline
 2,3-diphenyl-6-methyl-quinoxaline
 5,7-dibromo-8-hydroxyquinoline 7. In a process for the detection of traces of fluorescence, the step of applying a liquid test component to a test surface, and the step of inspecting said test surface under ultraviolet light for the presence of areas of fluorescence response, said liquid component consisting essentially of a liquid carrier in which a residual fluorescence response is quenched by the addition of an ultraviolet absorber dye, said ultraviolet absorber dye being present in a concentration sufficient to reduce the brightness of said residual fluorescence response to about 1% to 50% of its initial value.

8. A process in accordance with claim 7 in which said liquid component is at least one member selected from the group consisting of liquid-film dilution-expansion developers, rinse liquids, mineral oils, aromatic hydrocarbons, aliphatic hydrocarbons, ketones, alcohols, glycols, glycol ethers, plasticizers, detergent liquids, fluorocarbons, halocarbons, and water.

9. A process in accordance with claim 7 in which said ultraviolet absorber dye is at least one member from the group consisting of:
 4,4'-bis-(dimethylamino)-benzophenone (Michler's ketone)
 4,4'-bis-(diethylamino)-benzophenone
 2,4-dihydroxy-benzophenone
 2-hydroxy-4-methoxy-benzophenone
 2,2'-dihydroxy-4,4'-dimethoxy-benzophenone
 2,2'-tetrahydroxy-benzophenone
 2-hydroxy-4-methoxy-benzophenone-5-sulfonic acid
 sodium-2,2'-dihydroxy-4,4'-dimethoxy-5-sulfobenzophenone
 2,2'-dihydroxy-4-methoxy-benzophenone
 2,2'-dihydroxy-4-n-octoxy benzophenone
 2-hydroxy-4-methoxy-2'-carboxy benzophenone
 sodium-bis-(2-hydroxy-4-phenylamino-1,3,5-triazyl-(6))-benzidine-disulfonic acid
 sodium-1,4-bis-(2-hydroxy-4-phenylamino-1,3,5-triazyl-(6))-amino benzene-disulfonic acid
 2,3-diphenyl-quinoxaline
 2,3-diphenyl-6-methyl-quinoxaline
 5,6-dibromo-8-hydroxyquinoline

References Cited

UNITED STATES PATENTS

| | | |
|---|---|---|
| 3,108,187 | 10/1963 | Thornbury. |
| 3,300,642 | 1/1967 | Alburger. |
| 3,406,285 | 10/1968 | Scorgie et al. |

ARCHIE R. BORCHELT, Primary Examiner

U.S. Cl. X.R.
252—301.2, 301.3